United States Patent
Priem et al.

(10) Patent No.: US 12,194,688 B2
(45) Date of Patent: Jan. 14, 2025

(54) WELDING METHOD AND RESPECTIVE WELDING DEVICE

(71) Applicant: BRANSON Ultraschall Niederlassung der Emerson Technologies Gmbh & Co. OHG, Dietzenbach (DE)

(72) Inventors: Heiko Priem, Brachttal (DE); Wolfgang Kreckel, Hösbach (DE)

(73) Assignee: Branson Ultraschall Niederlassung der Emerson Techologies GmbH & Co. OHG, Dietzenbach (DE)

( * ) Notice: Subject to any disclaimer, the term of this patent is extended or adjusted under 35 U.S.C. 154(b) by 0 days.

(21) Appl. No.: 18/079,999

(22) Filed: Dec. 13, 2022

(65) Prior Publication Data

US 2023/0191709 A1     Jun. 22, 2023

(30) Foreign Application Priority Data

Dec. 16, 2021  (EP) ..................... 21215320

(51) Int. Cl.
  *B29C 65/06*  (2006.01)
  *B29C 65/14*  (2006.01)

(52) U.S. Cl.
  CPC .......... *B29C 65/06* (2013.01); *B29C 65/1412* (2013.01)

(58) Field of Classification Search
  None
  See application file for complete search history.

(56) References Cited

U.S. PATENT DOCUMENTS

| | | | |
|---|---|---|---|
| 5,086,964 A * | 2/1992 | Blaser | B29C 66/961 318/7 |
| 2014/0338814 A1 | 11/2014 | Klinstein et al. | |
| 2016/0107372 A1* | 4/2016 | Knecht | B29C 66/54 156/499 |
| 2016/0129627 A1* | 5/2016 | Fuchs | B29C 66/301 156/538 |
| 2017/0246707 A1* | 8/2017 | Bray | B23K 20/1225 |
| 2018/0229440 A1 | 8/2018 | Walter et al. | |

(Continued)

FOREIGN PATENT DOCUMENTS

| | | |
|---|---|---|
| CN | 103213275 A | 7/2013 |
| EP | 2837492 A1 | 2/2015 |
| EP | 3009254 A2 | 4/2016 |

(Continued)

OTHER PUBLICATIONS

Grande et al.; "Plastics Welding Laser & Infrared Systems Expand Capabilities"; Plastics Technology, Gardner Publications, Inc. US, vol. 50, No. 10; Oct. 1, 2004, pp. 72-76, XP009099225, ISSN: 0032-1257 (6 pages).

(Continued)

*Primary Examiner* — Michael N Orlando
*Assistant Examiner* — Abhishek A Patwardhan
(74) *Attorney, Agent, or Firm* — Barclay Damon LLP

(57) ABSTRACT

A welding method for welding a first component to a second component using a welding device including an upper tool mounted to an upper support for receiving the first component, a lower tool mounted to a lower support for receiving the second component as well as a preheating arrangement for preheating the first and/or the second component and a controller. A welding device in accordance with the welding method is further provided.

7 Claims, 6 Drawing Sheets

(56) References Cited

U.S. PATENT DOCUMENTS

2021/0053296 A1* 2/2021 Schwalme ........ B29C 66/73921

FOREIGN PATENT DOCUMENTS

| EP | 3020532 A1 | 5/2016 |
|----|------------|--------|
| JP | H05254021 A | 10/1993 |
| JP | 2016078456 A | 5/2016 |
| JP | 2017047617 A | 3/2017 |
| JP | 2018530463 A | 10/2018 |
| WO | 2019149480 A1 | 8/2019 |

OTHER PUBLICATIONS

Emerson Industrial Automation; "Clean Vibration Technology, For Parts Demanding Particulate-Free and Aesthetically Clean Plastic Weld Joints"; Aug. 30, 2021; XP05596053; Retrieved from the Internet <https://www.emerson.com/documents/automation/brochure-clean-vibration-welding-techology-overview-branson-en-us-160152.pdf> (6 pages).
EP 21 215 320.9; filed Dec. 16, 2021; Extended European Search Report dated Oct. 6, 2022 (10 pages).
Japanese Patent Office, Office Action from Japanese Patent Application No. 2022-191816, mailed Oct. 17, 2023 with English translation (total 8 pgs.).

* cited by examiner

WELDING METHOD AND RESPECTIVE WELDING DEVICE

CROSS REFERENCE TO RELATED APPLICATION

This application claims priority to EP Application No. 21 215 320.9, filed Dec. 16, 2021 under relevant portions of 35 U.S.C. 119. The contents of that earlier application are incorporated by reference in its entirety.

TECHNICAL FIELD

The present invention is related to a welding method for welding a first component to a second component using a welding device comprising an upper tool mounted to an upper support for receiving the first component, a lower tool mounted to a lower support for receiving the second component as well as a preheating arrangement for preheating the first and/or the second component and a controller. Further, the present invention is related to a respective welding device.

BACKGROUND

Welding devices for welding a first component to a second component comprising an upper tool mounted to an upper support for receiving the first component and a lower tool mounted to a lower support, such as a lifting table, for receiving the second component are known in the prior art.

Usually, such devices are used for welding two components to each other, wherein the components are preferably made of a plastic material. The welding devices further comprise a housing in which the lower tool as well as the upper tool are arranged. To this end, the lower tool is fastened to the lifting table as a lower support, whereas the upper tool is rigidly mounted to an upper tool plate as upper support.

Further, known plastic welding devices may comprise additionally a preheating arrangement for preheating the first and the second component prior to welding. In this regard, the preheating arrangement is usually coupled to the lifting table but may also be allowed to move independently from the lifting table by, for example, fastening the preheating arrangement directly at the housing. Due to the lifting table as lower support, the lower tool can be moved in the direction of the upper tool to weld the first component in the lower tool to the second component in the upper tool, especially by friction or vibration welding, respectively, or by infrared-welding.

Such welding devices are used for example in the automotive industry or in the medical technology. Uses in the automotive industry for such welding devices are the production of lights but also the production of other components or component groups which consist of plastic or contain plastic. In a similar way, the welding device may be used in the production of devices and/or component groups in the medical technology or in the production of consumer goods.

The basic operation of known welding devices with a preheating arrangement is as follows. At first a user places the second component on the lower tool. Subsequently, he positions the first component on the second component in the lower tool. Then, the lifting table with the lower tool and the components arranged thereon moves from an initial position in the direction of the upper tool until the first component abuts the upper tool. This movement takes place along only one axis which is vertical with respect to the floor or ground on which the welding device is arranged.

Then, the lifting table moves along this vertical axis back into a position in which the preheating arrangement can be arranged between the components. For example, the lifting table moves back into the initial position. Subsequently, the preheating arrangement is moved along a second axis perpendicular to the first axis, i.e., horizontal with respect to the floor or ground, from a parking position into an aligning position between the components to be welded. After the preheating arrangement has been arranged between the two components in the aligning position, the preheating arrangement is moved by a new and separate vertical movement, i.e., a movement along an axis vertical to the floor or ground, into a preheating position so that the two components are heatable at the places to be welded. Additionally, and after the preheating arrangement has reached the preheating position, the lower tool is moved along the first axis into a position adjacent to the preheating arrangement. This position is also called the adjacent position.

Subsequently to the pre-heating, the lifting table is moved along the vertical axis back into a position allowing the preheating arrangement to be moved into the parking position. For example, the lifting table moves back into the initial position. After the lifting table arrived at the initial position, the preheating arrangement is first moved back into the aligning position along the vertical axis and thereafter along the second horizontal axis into the parking position.

For welding the first component to the second component, the lifting table is now moved along the first axis into the welding position. The welding of the first component to the second component takes place by friction or vibration welding or by pressing the pre-heated components against each other.

After finishing the welding, the lifting table moves with the lower tool and the compound of first and second component arranged thereon along the vertical axis from the welding position back into the initial position. As soon as the lifting table has reached the initial position, the user may remove the compound of first and second component.

A first disadvantage of the above-described welding device with the preheating arrangement becomes apparent if components with complex protrusions or undercuts shall be heated and welded. In friction or vibration welding, a protrusion or undercut results especially due to the non-arbitrary variable angular position of the components to be welded with respect to each other. Especially, the two components must be placed in the respective tool in such a way that a friction or vibration welding force can be transferred effectively to the joining portion of the respective component. Due to this not freely determinable angular position of the two components with respect to each other as well as the movability of the tools solely along the vertical axis, undercuts or protrusions result depending on the components to be welded to each other. During a movement along the vertical axis, these would lead to a damaging and/or destruction of at least one of the components and/or one of the tools or the preheating arrangement.

Further, the movements of the welding device are time-consuming so that high cycle times result.

Several alternatives have been developed by the company BRANSON in this field for allowing the welding of two components to each other having a complex welding contour with undercuts and/or protrusions.

According to a first example as described in EP 2 837 492 A1, a vibration welding system comprises an upper support for an upper tool and a lifting table for receiving a lower tool. The lower tool can be lifted by a vertical drive. The vibration welding system also has at least one horizontal drive with which the lower tool can be moved in a horizontal direction. The vibration welding system also comprises at least one pivoting drive with which the lower tool can also be pivoted out of a horizontal plane.

Regarding the controlling of the respective drives, there are basically two types. In the case of a first type, the lower tool is moved by the respective vertical, horizontal, and pivoting drive independently of the respective other drives. This type of controlling means that a movement within the horizontal plane; that is, a pivoting out of the horizontal plane and a movement along the z-axis can take place at the same time.

In contrast to this and in the case of the second type of controlling, a movement takes place by only one of the respective drives. This means that only one procedure or moving along the z-axis, the x-axis, the y-axis or pivoting takes place. Of course, mixed types of these two types are possible.

Although this device or system, respectively, allows an adaption of the control curve used for energizing or actuating the drives to different welding contours so that the device can be used for different components, no preheating arrangement is present.

Other welding devices which have a preheating arrangement are described in EP 3 009 254 A2 and EP 3 020 532 A1. The preheating arrangement for a welding device described in EP 3 009 254 A2 comprises a support, at least one first preheating device and a pivoting arrangement with which the at least one first preheating device can be pivoted relative to a first surface of the support from a starting position into a preheating position. In this manner, an undercut of a first component can be circumnavigated, and the first component can be heated by the first preheating device.

EP 3 020 532 A1 on the other hand describes that the welding device comprises first and second tools arranged respectively at a first support and a second support. The first tool is movable by a first drive with respect to the first support in a first direction linearly between a first position and a second position. The movement along the first direction is defined by a first imaginary spherical coordinate system, the origin of which is arranged in the first position of the first tool. The z-axis as a first z-axis extends in the direction of the second support. For a first inclination angle between the first z-axis which is positive in the direction of the second support and the first direction it applies $0 \leq v1 \leq \lambda/2$, whereby a first component in the first tool can be brought into engagement with a second component in the second tool. In other words, this device realizes diagonal movement.

A disadvantage of the devices disclosed in EP 3 009 254 A2 and EP 3 020 532 A1 is that the respective devices are adapted to one specific component and, thus, compound to be manufactured. Further, the construction is complex, costly and has high cycle times.

It is therefore a problem of the present invention to provide a welding method for welding a first component to a second component which overcomes the above-mentioned disadvantages for a welding device having a preheating arrangement. In particular, a welding method shall be provided which allows the welding of complex structures while at the same time being applicable to different components and realizing a reduced cycle time compared to the known methods. Further, it is a problem to provide a respective welding device. In particular, the welding device shall allow the preheating of components having complex welding structures as well as the respective welding of these components while at the same time being adaptable to different components at least more easily.

SUMMARY

The above problems are solved by a welding method for welding a first component to a second component as well as a welding device for welding a first component to a second component. Further preferred embodiments and developments result from the following description, the drawings as well as the appending claims.

An inventive welding method for welding a first component to a second component uses a welding device comprising an upper tool mounted to an upper support for receiving the first component, a lower tool mounted to a lower support for receiving the second component, a preheating arrangement for preheating the first and/or the second component, and a controller. The welding method comprises the steps of: moving the upper and the lower tool relative to each other along a first axis by a first drive from an initial position to an adjacent position and moving the preheating arrangement by a second drive from a parking position to a preheating position at least partly at the same time, preheating the first and/or the second component by the preheating arrangement, thereafter moving the upper tool and the lower tool relative to each other along the first axis by the first drive from the adjacent position to a spaced position and moving the preheating arrangement by the second drive from the preheating position to the parking position at least partly at the same time, moving the upper tool and the lower tool relative to each other along the first axis by the first drive from the spaced position to a welding position, welding the first and the second component to each other in the welding position of the upper and the lower tool, and moving the upper tool and the lower tool relative to each other along the first axis by the first drive from the welding position to the initial position.

For a better understanding, the welding method is described in the following with respect to the operation of the respective welding device comprising the upper tool mounted to the upper support and the lower tool mounted to the lower support. The upper and the lower tool are movable relative to each other along the first axis. This is preferably realized in that the upper support to which the upper tool is advantageously rigidly mounted is an upper tool plate and in that the lower support to which the lower tool is mounted is a lifting table. As a result, in such an exemplary arrangement, only the lifting table as lower support will be moved along the first axis. This arrangement is particularly preferred in case of a vibration welding device, as explained also in detail below. Nevertheless, and in case an infrared welding method is used, a movability of the upper support may also be provided. For the sake of completeness, it is pointed out that the first axis is preferably a vertical axis, i.e., perpendicular to the floor on which the welding device is arranged. Further, the first and the second component to be welded to each other preferably consist of a plastic material.

For simplification, it is assumed that the first component is already arranged in the upper tool and the second component is already arranged in the lower tool. Furthermore, the first component has, as an example, a complex undercut. Within the framework of the present disclosure, an undercut is an element of the respective component, which protrudes from the component such that it covers an area of the component depending on the orientation of the component in the space. In order to further clarify the term undercut, a U-shaped component or area of a component is now assumed. If this U-shaped area is viewed from above or below, it does not contain an undercut, since all areas are freely accessible. However, if the U-shaped area is viewed from the side, then one leg, namely the front leg, covers respectively the other leg, namely the rear leg. One leg thus covers the other leg depending on the orientation of the component in the space. The respective front leg thus represents an undercut in terms of the present disclosure.

It also follows from the above explanation that a movement of the preheating arrangement, which is preferably an infrared-preheating arrangement, towards a surface covered by the undercut, for example a surface to be heated, may not be possible with a straight-line movement. Referring again to the exemplary U-shaped component and assuming that the preheating arrangement is arranged on the left side of the component, the preheating arrangement moves from the left towards the component. The front leg of the U-shaped component is the left leg which, thus, represents the undercut to be circumnavigated. The rear leg of the U-shaped component is the right leg. This right leg cannot be reached by the preheating arrangement through a movement solely in the direction of the rear leg since the preheating arrangement would collide with the front leg in this case. For clarification, the undercut is thus assumed to be an imaginary point or a curve, which represents the undercut and must be circumnavigated. Only after this circumnavigation can the preheating arrangement be arranged next to the surface of the first component to be heated.

Initially, the upper and the lower tool are located at such a distance from each other that the preheating arrangement can be arranged in between. This position is referred to as an initial position, which may also be a starting position, i.e., the position, which the upper and the lower tool have in the idle state of the plastic welding device. Further, it is assumed that the preheating arrangement is arranged in a parking position, i.e., not between the upper and the lower tool so that the preheating arrangement would not hinder a movement of the upper and the lower tool relative to each other.

Starting from the above points, movement of the preheating arrangement from the parking position to the preheating position by a second drive first occurs. In case of the exemplary U-shaped component, a sole movement along one axis may not be sufficient. Thus, and as in this example the second drive realizes a movement along a second axis being perpendicular to the first axis, a third drive is additionally provided for moving the preheating arrangement along a third axis that is parallel to the first axis. The movement of the preheating arrangement from the parking position into the preheating position, thus, takes place by energizing or actuating the second drive and the third drive at least partly at the same time. For example, after the second drive has moved the preheating arrangement along the second axis for a predetermined distance, the third drive is additionally energized or actuated so that additionally a movement along the third axis results. The combined movement is thus diagonal. Thus, it is particularly preferred that the movement from the parking position to the preheating position is a continuous movement. Continuous movement defines in this regard a movement without intermediate stops or intermediate positions. Accordingly, the second and the third drive are energized or actuated at least partly at the same time for realizing this effect. As a result, the path of the preheating arrangement is shortened compared to the prior art which moves the preheating arrangement along each of the axis separately.

Further, and at least partly at the same time as the movement of the preheating arrangement from the parking position to the preheating position takes place, movement of the upper and the lower tool relative to each other along the first axis by a first drive from the initial position to the adjacent position takes place. Thus, the first drive and at least one of the second and the third drive are also energized or actuated at the same time. As a further result, additional time savings can be realized by means of these combined or simultaneous movements.

For realizing such movements at the same time, the drives are controlled together by for example electronic cam disks. Thus, the drives are preferably electronically coupled to or synchronized with each other. This may be realized in particular by the controller. Due to this, the respective movements depend on each other. A further result of this course becomes clear in case of a failure of one drive as the remaining drives are stopped, preferably automatically, due to the common control so that a damaging of the first component, the second component, and/or the welding device is avoidable.

After the preheating arrangement has reached the preheating position and the upper tool as well as the lower tool are arranged in the adjacent position, the preheating of the first and/or the second component by the preheating arrangement occurs. To this end, and depending on the application, the preheating arrangement is preferably an infrared preheating arrangement. Further, the preheating arrangement has preferably a first and/or a second preheating device, wherein the first preheating device is arranged on an upper side facing in the preheating position the upper tool and the second preheating device is arranged on a lower side facing in the preheating position the lower tool.

Subsequently to the preheating, the upper and the lower tool are moved relative to each other from the adjacent position to a spaced position, which may be the initial position or any intermediate position allowing a movement of the preheating arrangement into the parking position. Accordingly, and at least partly at the same time, the preheating arrangement is moved from the preheating position to the parking position, preferably in a continuous manner, as explained above. Thus, the above movements are reversed.

As soon as the preheating arrangement does not hinder a movement of the upper and the lower tool into the welding position, the respective movement may take place. For example, and according to a preferred embodiment, the movement takes place either directly after the preheating arrangement does not hinder such movement or after the preheating arrangement has reached the parking position. In the welding position of the upper and the lower tool, a welding of the first and the second components with each other then takes place in the known manner. Preferably, the welding method is a vibration or friction welding method, or the welding method is an infrared welding method. In case of the latter, the preheating arrangement is an infrared preheating arrangement and in the step of welding, the preheated first and second component are solely pressed against each other.

Depending on the undercut being present for example in the first component arranged in the upper tool, the lower tool must be arranged in a movable manner in the space so that the lower tool with the second component can circumnavigate the undercut in the first component. This applies particularly for friction or vibration welding devices since here a movement of the upper tool is not realizable due to the forces occurring during the friction or vibration welding. In these cases, it is particularly preferred to use for example a lower tool or lower support as described in EP 2 837 492 A1. In this regard, and according to a particularly preferred embodiment, the controller controls preferably further drives, particularly preferred all drives, of the welding device. As a result, and with respect to the lower tool or lower support of EP 2 837 492 A1 for exemplary reasons, the drives for moving the lifting table in the horizontal plane and/or pivoting the lifting table can also be energized or actuated at least partly at the same time as the first and/or second drive are energized or actuated.

In the case of an infrared welding device, the upper tool can also be movably arranged in the space since no friction or vibration welding forces act here on the upper tool, i.e., in particular no vibrations during a friction welding process.

One advantage of the inventive welding method is, thus, that the paths to be traveled by the elements of the welding device are shortened by avoiding intermediate stops or positions and/or that movements of different elements occur at the same time. Each of this realizes time savings compared to prior art welding methods. Thus, the welding process is made more efficient, i.e., the cycle times are reduced, and the output is increased.

Additionally, and as the movements occurring at the same time are controlled by a common control so that the respective drives are electronically coupled to or synchronized with each other, a damaging of the first component, the second component and/or the welding device in case of a failure of one drive is avoidable in a reliable manner.

According to a preferred embodiment of the welding method, the controller controls, preferably electronically couples or synchronizes, the first drive and the second drive such that they are energized or actuated at least partly at the same time. The controller realizing the electronic coupling or synchronization of the movements or drives may be the controller of one of the drives which acts as master or host controller or a separate master or host controller. Using one of the controllers already present realizes a cost-effective embodiment. On the other hand, the usage of a separate controller as master or host controller ensures sufficient processing power and a higher variability in view of different applications.

In an advantageous embodiment of the welding method, the second drive moves the preheating arrangement along a second axis being perpendicular to the first axis and a third drive is provided for moving the preheating arrangement along a third axis being parallel to the first axis. In this regard, and according to a further preferred embodiment of the welding method, the controller controls, preferably electronically couples or synchronizes, the third drive with the first drive and the second drive and at least two of the first drive, the second drive and the third drive are energized or actuated at the same time. These embodiments have been explained in detail in the above example having the U-shaped first component. As a particular advantage, the flexibility of the welding method and the welding device regarding the adaption to different components to be welded to each other is increased in this way. Further, and due to energizing or actuating at least two drives at the same time, the time required for moving the structural elements of the welding device between two positions is reduced, as also explained above.

According to a preferred embodiment of the welding method, the first and the second drive are servo drives. Servo drives are used to follow a specified target movement by nominal position values in the form of nominal paths or nominal angles. This means that the servo drive follows a specified target path or target angle with a small deviation. Such course requires a measurement of the actual values and a control to compare the setpoint and actual values. A servo drive is accordingly a drive with electronic position, speed and/or torque control with high to very high demands on the dynamics, the setting ranges and/or the accuracy of the movement. Instead of the term servo drive, the term "servo axis" is often used. The use of such servo drives as the first drive and second drive ensures a reliable control of the movements and due to the electronic coupling or synchronization of these drives, a fast interruption of the movement of the drives, in particular all drives, in case of failure of one drive.

In a further preferred embodiment of the welding method, one drive acts as a master drive and the remaining drives act as slave-drives, preferably the drive energized or actuated first by the controller is defined as the master drive. For example, for reaching the preheating position, the preheating arrangement is first moved for a specified or predetermined distance along the second axis by the second drive. When reaching this distance, the third drive is additionally energized or actuated by the controller so that a diagonal movement results. Additionally, the first drive may be energized or actuated at the same time so that the actuation of the first drive is also dependent on the second drive realizing the predetermined distance.

In a particularly preferred embodiment of the welding method, in case of a failure of one drive, the remaining drive or drives which are energized or actuated at least partly at the same time are stopped by the controller. Thus, and due to the electronic coupling or synchronization of the drives in the controller, a damaging of the components to be welded and/or the welding device is avoidable, even though movements of the preheating arrangement, the upper and/or the lower tool are performed at the same time.

An inventive welding device for welding a first component to a second component using the inventive welding method, comprises an upper tool mounted to an upper support for receiving the first component, a lower tool mounted to a lower support for receiving the second component as well as a preheating arrangement for preheating the first and/or the second component, wherein the upper and the lower support are movable relative to each other along a first axis by a first drive between an initial position, an adjacent position, a spaced position, and a welding position and the preheating arrangement is movable by a second drive between a parking position and a preheating position, wherein the welding device comprises a controller controlling, preferably electronically coupling or synchronizing, the first drive and the second drive such that they are energized or actuated at least partly at the same time. The controller realizing the electronic coupling or synchronization of the movements or drives may be the controller of one of the drives which acts as master or host controller or a separate master or host controller. Using one of the controllers already present realizes a cost-effective embodiment. On the other hand, the usage of a separate controller as master or host controller ensures sufficient processing power and a higher variability. By means of the inventive welding device, the inventive welding method is performed. Thus, and with respect to the resulting technical effects and advantages, it is referred to the above explanation of the inventive welding method for avoiding redundancies.

According to a preferred embodiment of the welding device, the second drive moves the preheating arrangement along a second axis being perpendicular to the first axis and a third drive is provided for moving the preheating arrangement along a third axis being parallel to the first axis. Preferably, the controller controls the drives such that at least two of the first drive, the second drive and the third drive are energized or actuated at the same time. These embodiments have been explained in detail in the above example having the U-shaped first component. As a particular advantage, the flexibility of the complete welding device regarding the adaption to different components to be welded to each other is increased in this way. Further, and due to energizing or actuating at least two drives at the same time, the time required for moving the structural elements of the welding device between two positions is reduced, as also explained above.

The welding device is preferably a vibration welding device or an infrared welding device. Further preferred, the first and the second component consist of a plastic material. This results in the welding device being a plastic welding device. Moreover, it is preferred that the first drive and the second drive are servo drives. Each of these embodiments has been discussed above with respect to the respective embodiments of the welding method so that it is referred to these explanations for avoiding repetitions.

BRIEF DESCRIPTION OF THE DRAWINGS

In the following, the present invention will be described in detail based on the drawings. In the drawings, the same reference signs denote the same elements and/or components. It shows.

DETAILED DESCRIPTION OF PREFERRED EMBODIMENTS

Figure 1:
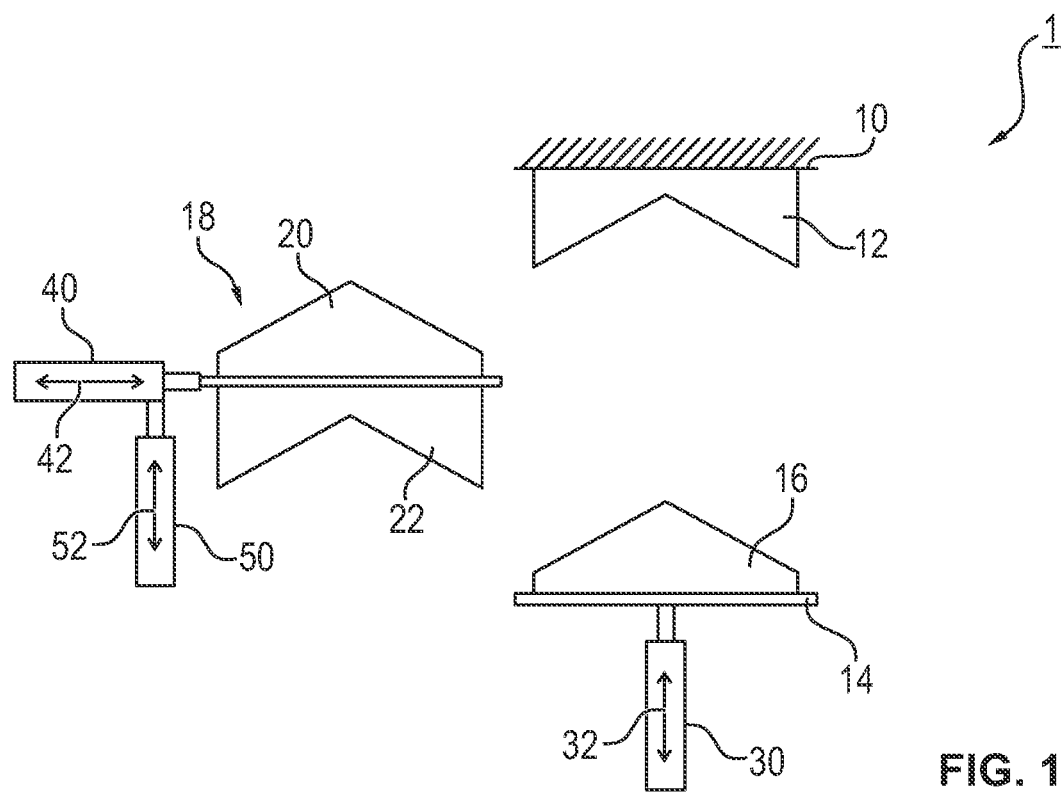
FIG. 1 depicts a welding device having a preheating arrangement in an initial position.

In the following, an embodiment of the inventive method is explained based on the functioning of a respective welding device. For increasing the understanding of the technical effects of the welding method, first the known procedure is illustrated based in FIGS. 1 to 5.

The welding device 1 comprises an upper tool 12 mounted to an upper support 10 and a lower tool 16 mounted to a lower support 14. The upper tool 12 and the lower tool 16 are movable relative to each other by a first drive 30 along a first axis 32. In the present example, the upper support 10 to which the upper tool 12 is rigidly mounted is an upper tool plate and the lower support 14 to which the lower tool 16 is mounted is a lifting table. As a result, in such an exemplary arrangement, only the lifting table as the lower support 14 will be moved along the first axis 32.

Further, the welding device 1 comprises a preheating arrangement 18 having a first preheating device 20 and a second preheating device 22. The first preheating device 20 is arranged on an upper side facing in a preheating position the upper tool 12 and the second preheating device 22 is arranged on a lower side facing in the preheating position the lower tool 16. Further, the preheating arrangement 18 comprises a second drive 40 for movement along a second axis 42. The second axis 42 is perpendicular to the first axis 32. Further, a third drive 50 is provided for a movement of the preheating arrangement 18 along a third axis 52. The third axis 52 is parallel to the first axis 32.

In FIG. 1, the upper tool 12 and the lower tool 16 of the respective welding device 1 are arranged in an initial position, i.e., a starting position. The preheating arrangement 18 is arranged in a parking position.

Due to the shape of the components to be welded, which is reflected by the shape of the upper tool 12 and the lower tool 16, an undercut is present. An undercut is an element, which protrudes from the respective component such that it covers an area of the component depending on the orientation of the component in the space. In the example, the upper tool 12 is formed like a roof having a gable or, in other words, it provides a reversed V-shape. The lower tool 16 has a complementary shape. The first component and the second component are formed such that they match the form provided by the upper tool 12 and the lower tool 16. Further, the first preheating device 20 and the second preheating device 22 have also a shape matching the form provided by the respective tools 12, 16.

If the reverse V-shaped upper tool 12 is viewed from below, i.e., from the lower tool 16 along the first axis 32, it does not contain an undercut since all areas are freely accessible. However, if the upper tool 12 is viewed from the side, then one side, namely the left side, covers respectively the other side, namely the right side. One side thus covers the other side depending on the orientation in the space. The respective left side thus represents an undercut in terms of the present disclosure. For clarification, the undercut is thus assumed to be an imaginary point or a curve, which represents the undercut and must be circumnavigated. Only after this circumnavigation can the preheating arrangement 18 be arranged next to the surface of the first component to be heated. Further, it also follows from the above explanation that a movement of the preheating arrangement 18 towards a surface covered by the undercut, for example a surface to be heated, may not be possible with a single straight-line movement.

The operation is such that in a first step a user places the second component on the lower tool 16. Subsequently, the user positions the first component on the second component in the lower tool 16. Then, the lower support 14 with the lower tool 16 and the components arranged thereon moves from an initial position in the direction of the upper tool 12 until the first component abuts the upper tool 12. This movement takes place along the first axis 32 by means of the first drive 30. The first axis 32 is vertical with respect to the floor or ground on which the welding device 1 is arranged. Then, the lower support 14 moves along this vertical first axis 32 back into a position in which the preheating arrangement 18 can be arranged between the components, here the initial position. For example, the lifting table moves back into the initial position.

Figure 2:
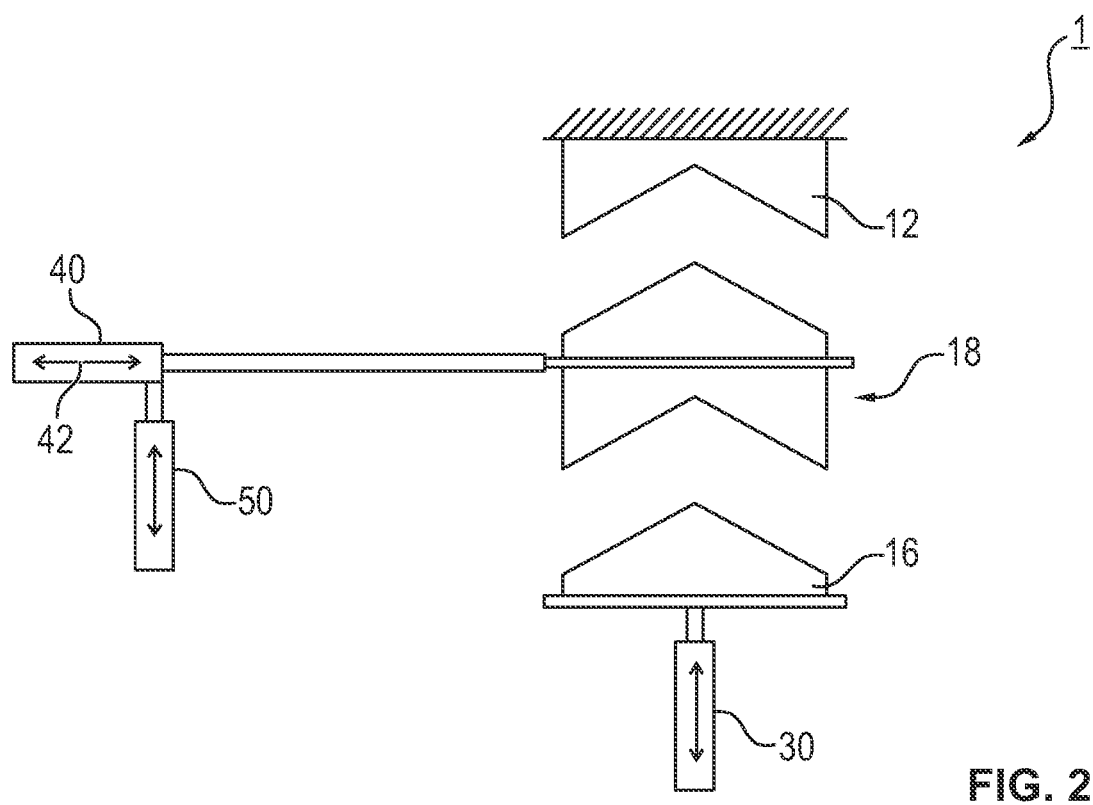
FIG. 2 shows the welding device according to FIG. 1 with the preheating arrangement being positioned in an intermediate position.
Figure 5:
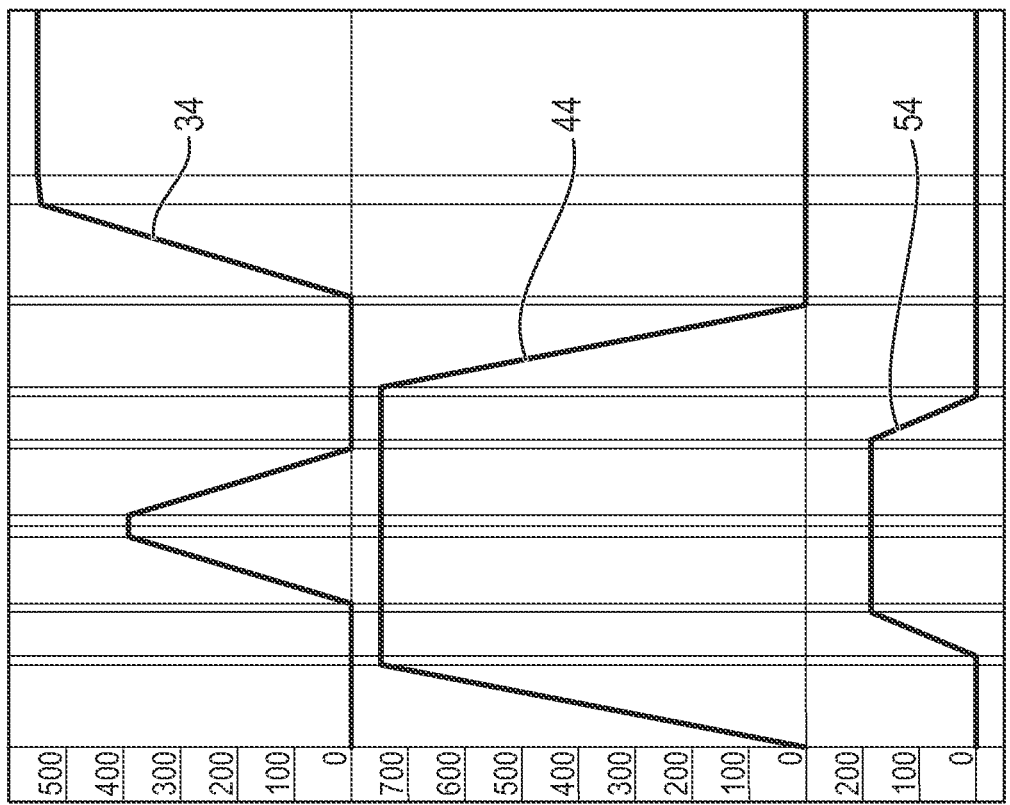
FIG. 5 shows a diagram of the movement of the structural components of the welding device according to the prior art.

For circumnavigating the undercut, the preheating arrangement 18 is moved in a second step by the second drive 40 along the second axis 42 perpendicular to the first axis 32, i.e., horizontal with respect to the floor or ground, from a parking position into an aligning position between the components to be welded. This position is shown in FIG. 2. The respective movement curve realized by the second drive 40 over time is indicated in FIG. 5 by reference sign 44.

Figure 3:
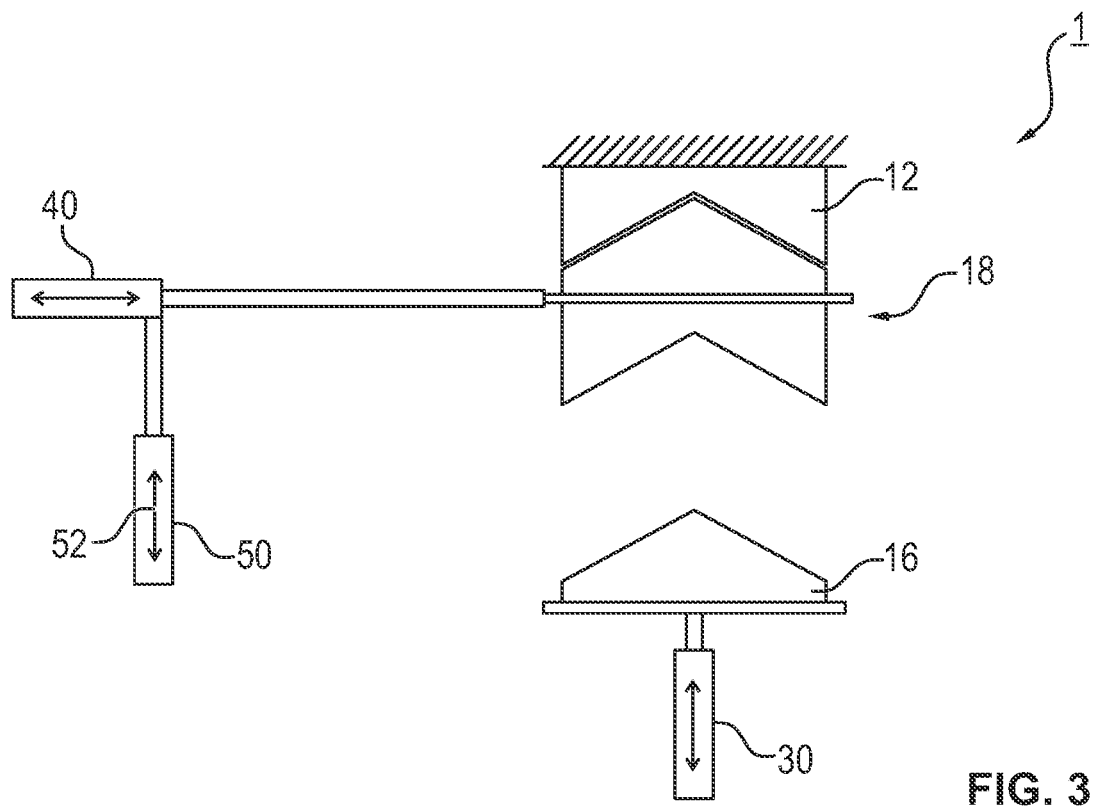
FIG. 3 shows the welding device according to FIG. 1 with the preheating arrangement being positioned in a preheating position.

After the preheating arrangement 18 has been arranged between the two components in the aligning position, the preheating arrangement 18 is moved in a third step by the third drive 50 along the third axis 52 into the preheating position. This position is indicated in FIG. 3. The corresponding movement curve realized by the third drive 50 over time is indicated in FIG. 5 by reference sign 54.

Figure 4:
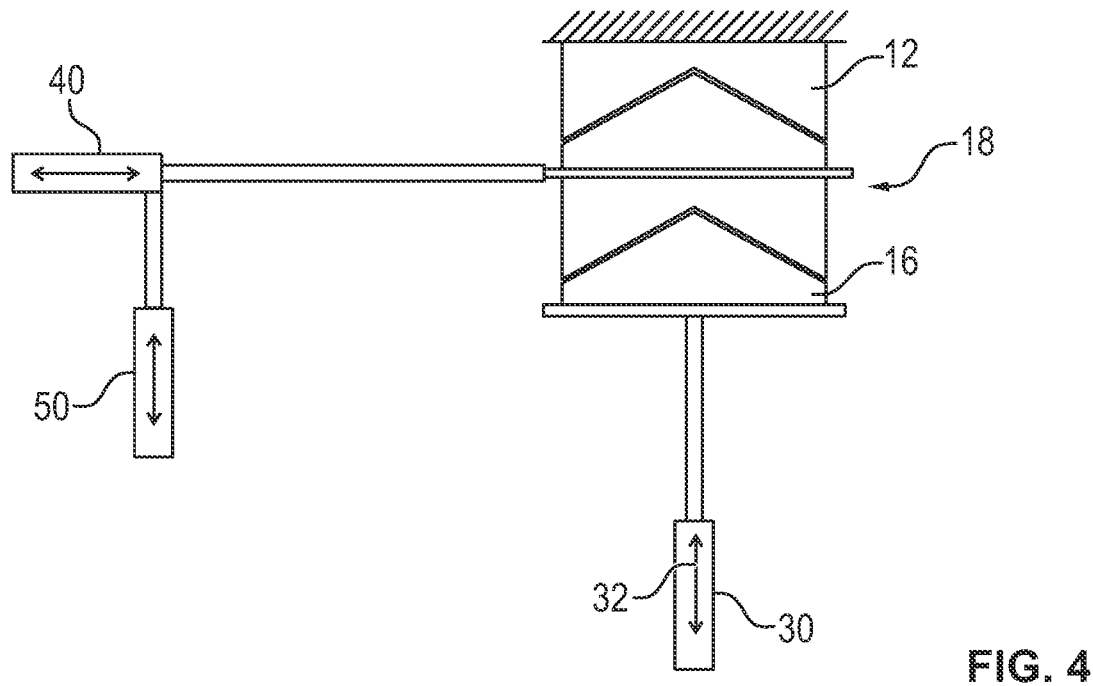
FIG. 4 shows the welding device according to FIG. 1 with the preheating arrangement being positioned in the preheating position and the lower tool in an adjacent position.

In a fourth step and after the preheating arrangement 18 has reached the preheating position, the lower tool 16 is moved along the first axis 32 into a position adjacent to the preheating arrangement 18. This position is also called the adjacent position and is indicated in FIG. 4. The movement curve realized by the first drive 30 over time is indicated in FIG. 5 by reference sign 34.

The preheating then takes place in a fifth step, in which all structural elements of the welding device are held in their position. This can be seen in FIG. 5 from the respective movement curves.

Subsequently to the pre-heating, the above movements are performed in a reversed order. Thus, the lower support 14 is moved in a sixth step along the first axis 32 back into a position allowing the preheating arrangement 18 to be moved into the parking position. According to the movement curve 34, the lower support 14 is moved back to the initial position as indicated in FIG. 3.

Next and in a seventh step, the preheating arrangement 18 is moved along the third axis 52 by the third drive 50 back into the aligning position shown in FIG. 2. In an eighth step, the preheating arrangement 18 is moved along the second axis 42 by the second drive 40 into the parking position with reference to FIG. 1. The respective movements and their sequence order are also indicated in FIG. 5.

For welding the first component to the second component, the lower support 14 is now moved in a ninth step along the first axis 32 into the welding position. The welding of the first component to the second component takes place in a tenth step.

After finishing the welding, the lower support 14 moves in step eleven with the lower tool 16 and the compound of first and second component arranged thereon along the first axis 32 from the welding position back into the initial position. As soon as the lower support 14 has reached the initial position, the user may remove the compound of first and second component.

From the above and with respect to FIG. 5, the actuation of each drive occurs only one at a time for avoiding collisions in particular in case of highly complex components to be welded. This applies for all types of drives, i.e., servo drives, pneumatic drives, or hydraulic drives.

Now referring to FIGS. 6 to 12, an embodiment of the inventive welding method is explained in comparison to the above discussed welding method.

The welding device 100 used here comprises an upper tool 112 mounted to an upper support 110 and a lower tool 116 mounted to a lower support 114. The upper 112 and the lower tool 116 are movable relative to each other by a first drive 130 along a first axis 132. Here, the upper support 110 to which the upper tool 112 is rigidly mounted is an upper tool plate and the lower support 114 to which the lower tool 116 is mounted is a lifting table. As a result, in such an exemplary arrangement, only the lifting table as lower support 114 will be moved along the first axis 132.

This arrangement is particularly preferred in case of a vibration welding device. Nevertheless, and in case an infrared welding method is used, a movability of the upper support 110 may also be provided. For the sake of completeness, it is pointed out that the first axis 132 is preferably a vertical axis, i.e., perpendicular to the floor on which the welding device 100 is arranged. Further, the first component and the second component to be welded to each other preferably consist of a plastic material.

The welding device 100 comprises also a preheating arrangement 118 having a first preheating device 120 and a second preheating device 122. The first preheating device 120 is arranged on an upper side facing in a preheating position the upper tool 112 and the second preheating device 122 is arranged on a lower side facing in the preheating position the lower tool 116. Further, the preheating arrangement 118 comprises a second drive 140 for movement along a second axis 142. The second axis 142 is perpendicular to the first axis 132. Further, a third drive 150 is provided for a movement of the preheating arrangement 118 along a third axis 152. The third axis 152 is parallel to the first axis 132.

Additionally, the welding device 100 comprises a controller for controlling, preferably electronically coupling or synchronizing, the first drive 130, the second drive 140 and the third drive 150. The controller may be the controller of one of the drives 130, 140, 150 which acts as master or host controller or a separate master or host controller. Using one of the controllers already present realizes a cost-effective embodiment. On the other hand, the usage of a separate controller as master or host controller ensures sufficient processing power and a higher variability in view of different applications.

Further, and with respect to the drives 130, 140 and 150, they are realized as servo drives. The use of such servo drives ensures a reliable control of the movements and due to the controller, a fast interruption of the movement of the drives, in particular all drives, in case of failure of one drive can be achieved, as discussed in the following. Further, servo drives have the advantage of providing fast movements compared to pneumatic or hydraulic drives while at the same time producing less noise and consuming less energy.

Figure 8:
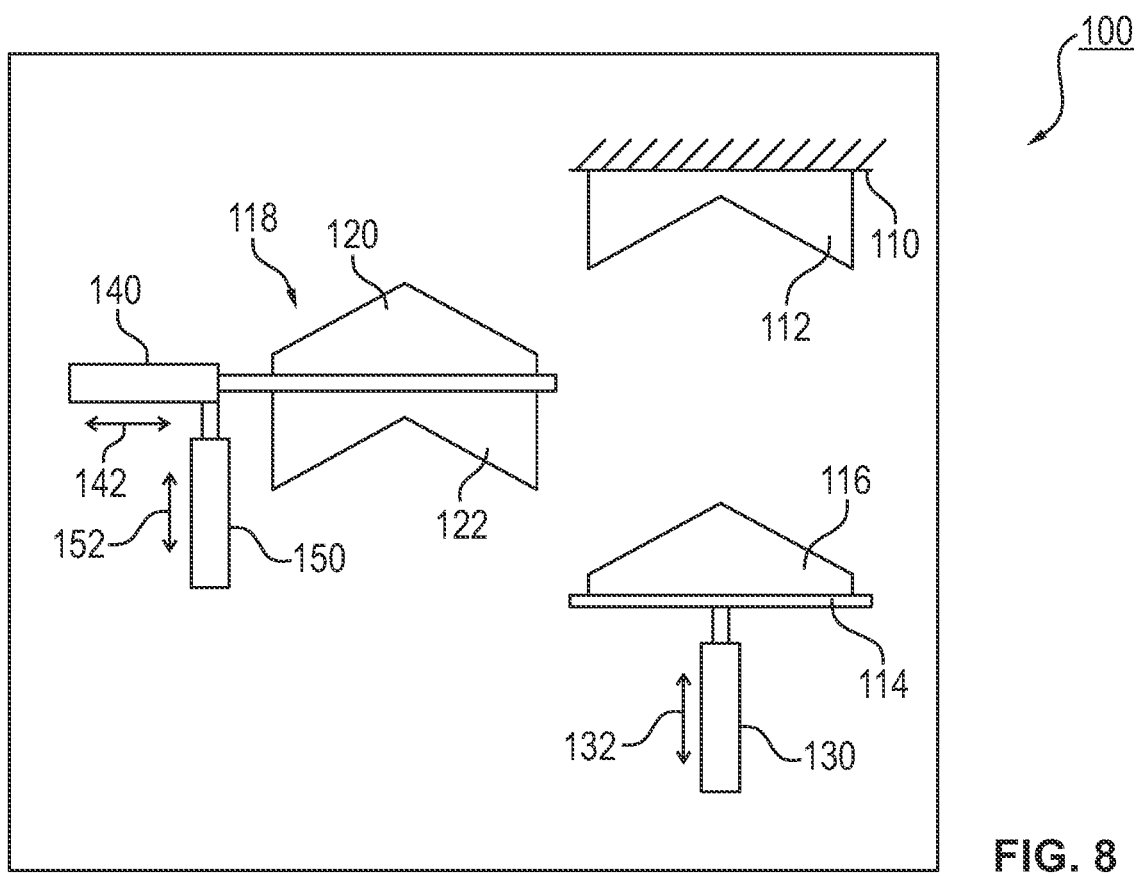
FIG. 8 shows the welding device at time T1/T1' of an embodiment of the inventive welding method.
Figure 9:
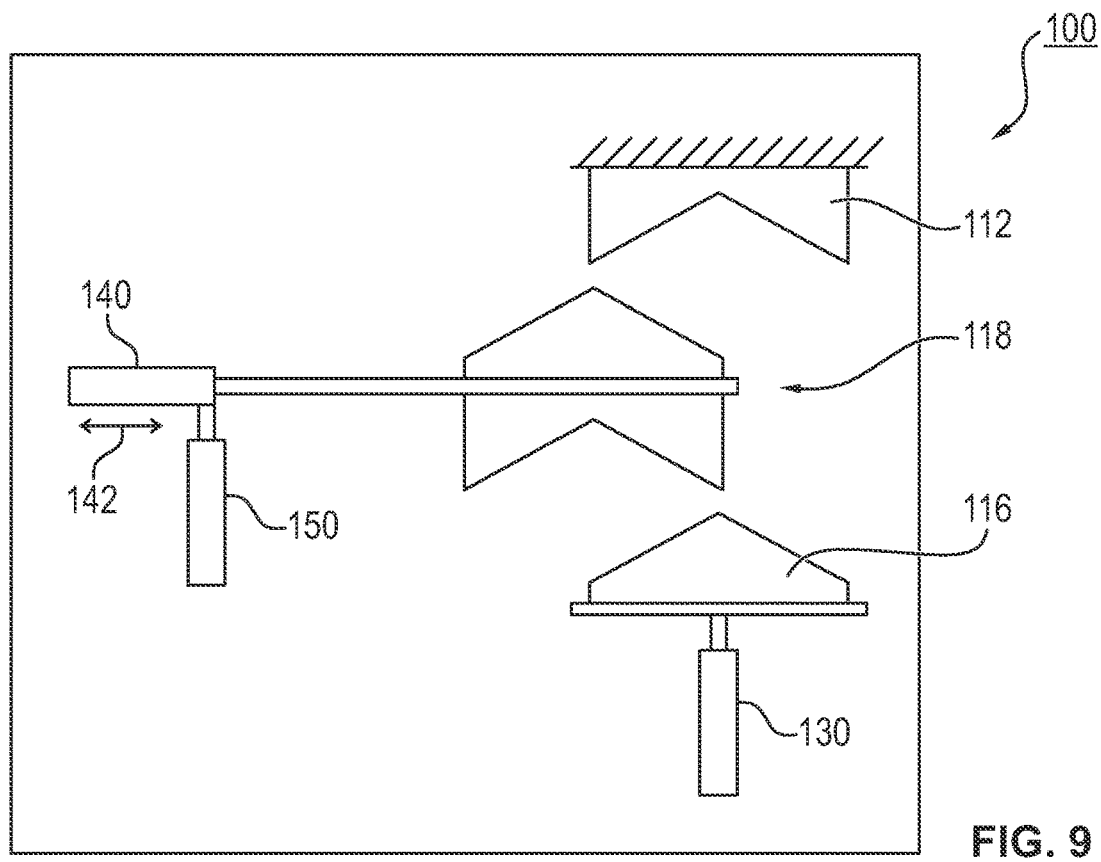
FIG. 9 shows the welding device at time T2/T2' of an embodiment of the inventive welding method.

In FIG. 8, the upper tool 112 and the lower tool 116 of the respective welding device 100 are arranged in an initial position, i.e., a starting position. The preheating arrangement 118 is arranged in a parking position.

The first step S1 is identical to the above described first step for arranging the first component and the second component in the upper tool 112 and the lower tool 116. At the end of the first step S1, the welding device 100 has the positions as indicated in FIG. 8 and by reference sign T1 in FIGS. 6 and 7. In this regard, FIG. 7 illustrates simplified electronic cam disks used by the controller for controlling the movement of the drives 130, 140 and 150.

Now, and in a second step S2, the moving of the preheating arrangement 18 from the parking position to the preheating position by the second drive 140 and the third drive 150 occurs without intermediate position. For achieving this, the second drive 140 and the third drive 150 are controlled by the controller such that they are at least partly energized or actuated at the same time.

Figure 6:
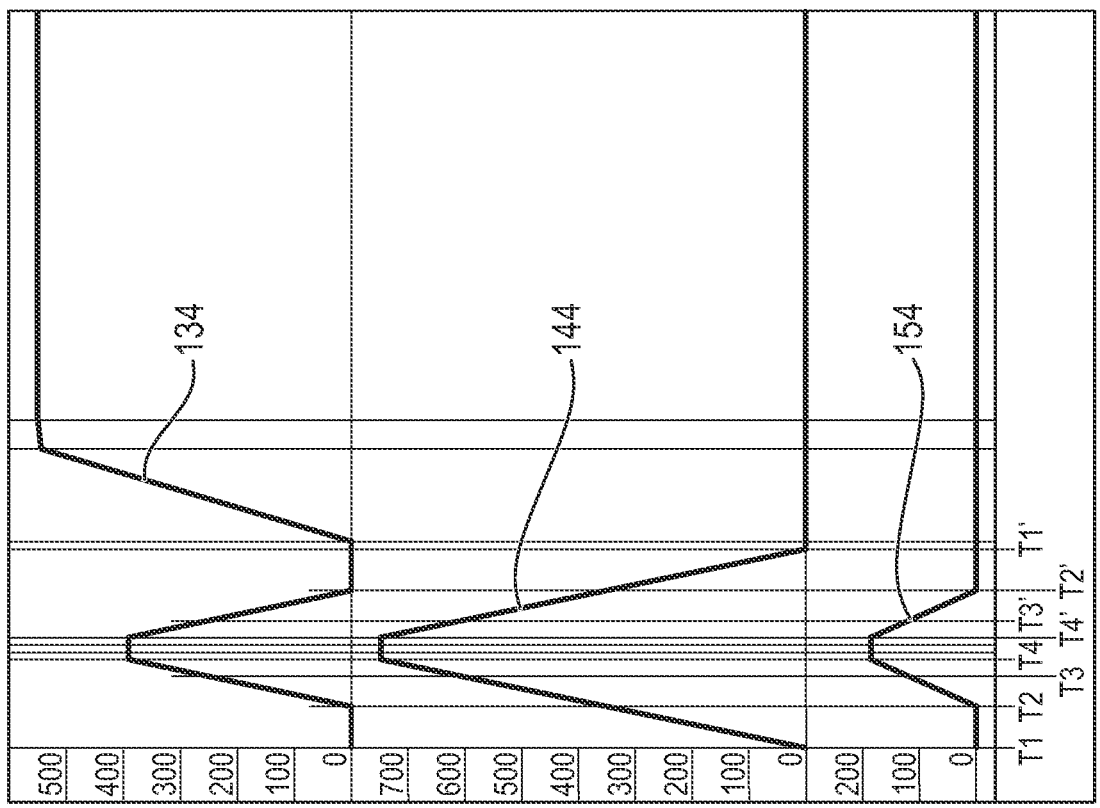
FIG. 6 shows a diagram of the movement of the structural components of the welding device according to an embodiment of the inventive welding method.
Figure 7:
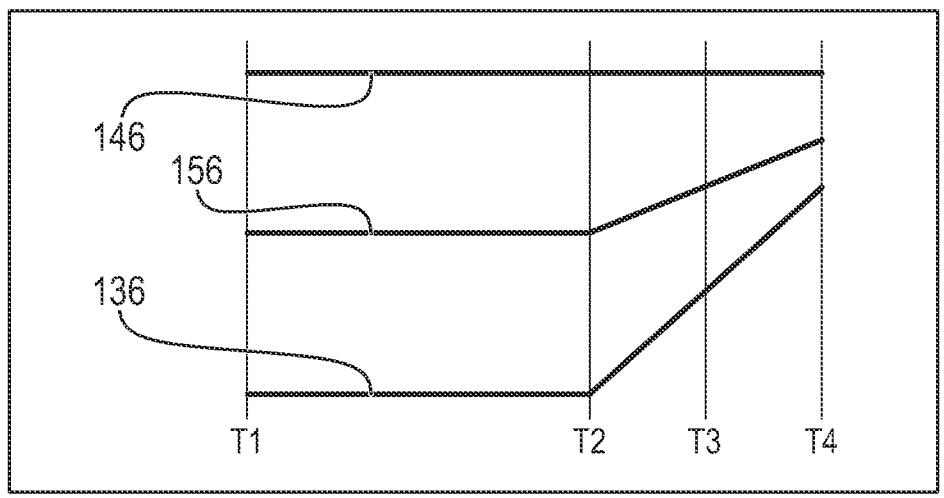
FIG. 7 shows a diagram of simplified electronic cam disks.

For example, and with respect to FIGS. 6 and 7, after the second drive 140 has moved the preheating arrangement 18 along the second axis 142 for a predetermined distance (see reference sign T2 in FIGS. 6 and 7 and the position shown in FIG. 9), the third drive 150 is additionally energized or actuated so that additionally a movement along the third axis 152 results. The movement is thus continuous, and the combined movement is diagonal. Continuous movement defines in this regard a movement without intermediate stops or intermediate positions.

Also starting at reference sign T2, the first drive 130 is energized or actuated resulting in a movement of the lower support 114 along the first axis 132 (see FIGS. 6 and 7).

Figure 10:
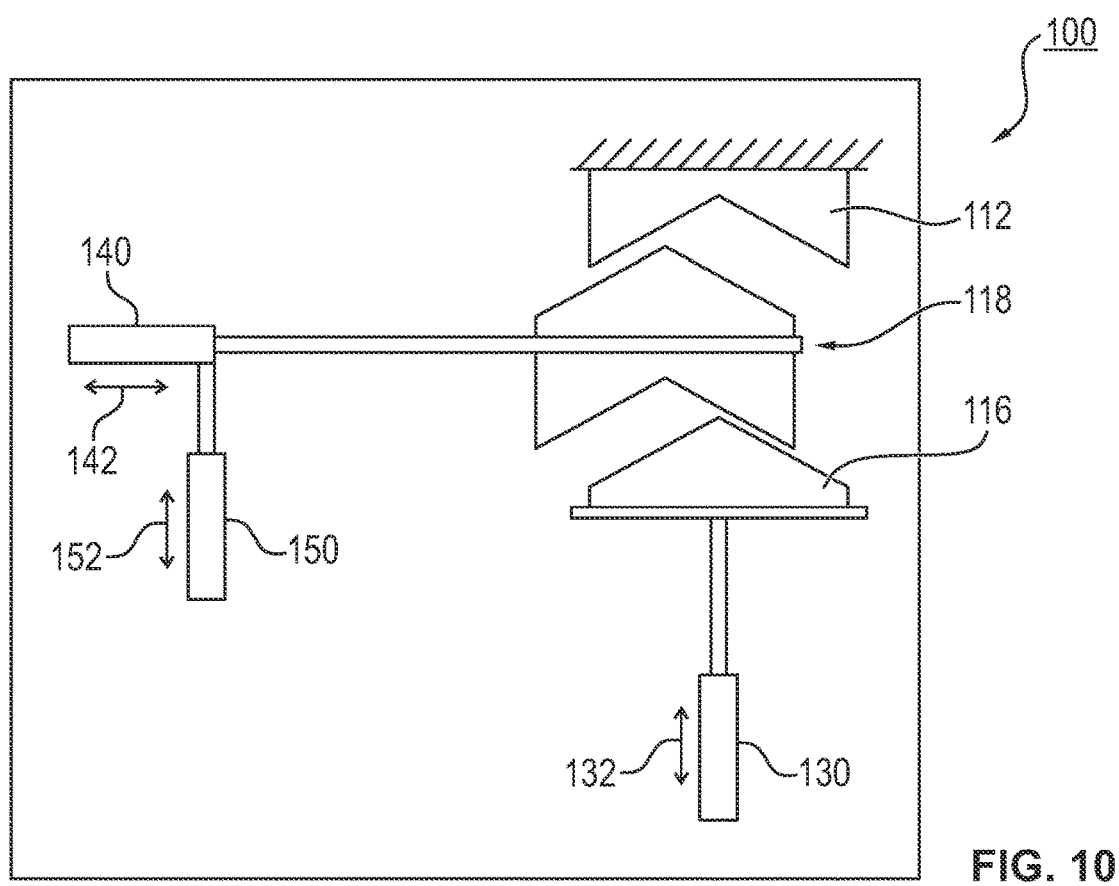
FIG. 10 shows the welding device at time T3/T3' of an embodiment of the inventive welding method.
Figure 11:
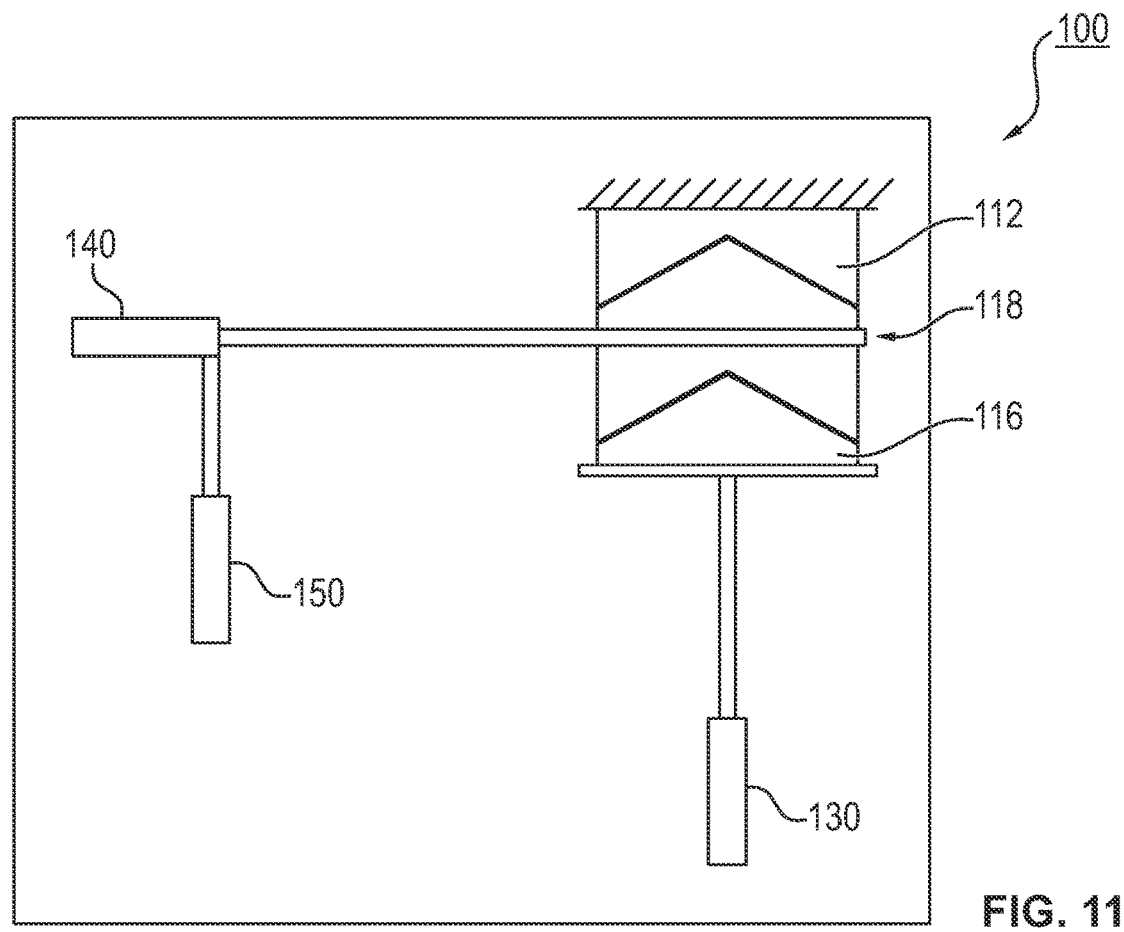
FIG. 11 shows the welding device at time T4/T4' of an embodiment of the inventive welding method.
Figure 12:
FIG. 12 shows a flow chart of an embodiment of the inventive welding method.

For an easier understanding, FIG. 10 shows the position at reference sign T3 in FIGS. 6 and 7. At the end of the second step S2, the welding device 100 shows the configuration of FIG. 11, which corresponds to reference sign T4.

A result of this course of procedure is that the path of the preheating arrangement 118 is shortened compared to the above welding method which moves the preheating arrangement 18 along each of the axis separately. A further reduction of the time required before the preheating of the components to be welded can take place in step S3 is achieved by the movement of the lower support 114 from the initial position to the adjacent position at the same time as the third drive 150 of the preheating arrangement 118 is energized or actuated by the controller.

As mentioned above and for realizing such movements at the same time, the drives 130, 140 and 150 are controlled together by for example electronic cam disks. Thus, the drives 130, 140 and 150 are preferably coupled to or synchronized with each other. This is realized by the controller. Due to this, the respective movements depend on each other so that in case of a failure of one drive 130, 140, 150 the remaining drives are stopped, preferably automatically, due to the common control. Accordingly, a damaging of the first component, the second component, and/or the welding device 100 is avoidable.

Further, the second drive 140 acts in this example as a master drive and the remaining drives 130, 150 act as slave-drives. This is due to the fact that the second drive 140 is initially energized or actuated without the remaining drives being energized or actuated. Accordingly, and only after the second drive 140 has realized the predetermined distance indicated by reference sign T2, the remaining drives are energized or actuated by the controller.

Next, the preheating takes place in step S3. To this end, and depending on the application, the preheating arrangement is preferably an infrared preheating arrangement.

Thereafter, the above movements are performed in the reverse order in step S4, which is indicated by the reference signs T3', T2' and T1' in FIG. 6. Thus, the lower tool 116 is moved along the first axis 132 from the adjacent position to a spaced position, which may be the initial position or any intermediate position allowing a movement of the preheating arrangement 118 into the parking position. Accordingly, and at least partly at the same time, the preheating arrangement 118 is moved from the preheating position to the parking position, preferably in a continuous manner, as explained above. At the end of step S4, the welding device 100 is arranged in the position shown in FIG. 8.

Next, and in steps S5 to S7, the above explained steps nine to eleven are performed. Thus, the lower tool 116 is moved into the welding position, the components are welded to each other and the lower tool 116 is moved back to the initial position so that a user may remove the produced compound of first and second component.

PARTS LIST FOR FIGS. 1-12

1 welding device
10 upper support
12 upper tool
14 lower support
16 lower tool
18 preheating arrangement
20 first preheating device
22 second preheating device
30 first drive
32 first axis
34 movement sequences realized by the first drive 30 along the first axis 32
40 second drive
42 second axis
44 movement sequences realized by the second drive 40 along the second axis 42
50 third drive
52 third axis
54 movement sequences realized by the third drive 50 along the third axis 52
100 welding device
110 upper support
112 upper tool
114 lower support
116 lower tool
118 preheating arrangement
120 first preheating device
122 second preheating device
130 first drive
132 first axis
134 movement sequences realized by the first drive 130 along the first axis 132
136 simplified electronic cam disk for the movement to be realized by the first drive 130 along the first axis 132
140 second drive
142 second axis
144 movement sequences realized by the second drive 40 along the second axis 42
146 simplified electronic cam disk for the movement to be realized by the second drive 140 along the second axis 142
150 third drive
152 third axis
154 movement sequences realized by the third drive 150 along the third axis 152
156 simplified electronic cam disk for the movement to be realized by the third drive 150 along the third axis 152

It should be noted that various modifications are possible that employ one or more aspects of the invention as described herein, including the following appended claims.

The invention claimed is:

1. A plastic welding method for welding a first component consisting of plastic material to a second component consisting of plastic material using a plastic welding device comprising an upper tool mounted to an upper support adapted to receive the first component, wherein the upper support is an upper tool plate and the upper tool reflects a shape of the first component, a lower tool mounted to a lower support adapted to receive the second component, wherein the lower support is a lifting table and the lower tool reflects a shape of the second component, an infrared preheating arrangement adapted to preheat the first and/or the second component, wherein the infrared heating arrangement comprises a first preheating device arranged on an upper side and/or a second preheating device on a lower side, wherein the first and the second preheating devices have a shape matching the form provided by the respective tools, and a controller, the method comprising the steps of:

a. continuously moving the upper and the lower tool relative to each other along a first axis by a first drive from an initial position to an adjacent position and, at least partly at the same time as continuously moving the upper and lower tool, continuously moving the infrared preheating arrangement by a second and a third drive from a parking position, in which the infrared preheating arrangement is not arranged between the upper tool and the lower tool, to a preheating position, such that the first preheating device faces the upper tool and/or the second preheating device faces the lower tool, wherein the second drive moves the infrared preheating arrangement along a second axis that is perpendicular to the first axis and the third drive moves the infrared preheating arrangement along a third axis, the third axis being parallel to the first axis, b. preheating the first and/or the second component by the infrared preheating arrangement in the preheating position, thereafter c. continuously moving the upper tool and the lower tool relative to each other along the first axis by the first drive from the adjacent position to a spaced position and, at least partly at the same time as continuously moving the upper tool and the lower tool relative to each other, continuously moving the infrared preheating arrangement by the second and the third drive from the preheating position to the parking position, in which the infrared preheating arrangement is not arranged between the upper tool and the lower tool, d. moving the upper tool and the lower tool relative to each other along the first axis by the first drive from the spaced position to a welding position, e. welding the first component and the second component to each other in the welding position of the upper tool and the lower tool, and f. moving the upper tool and the lower tool relative to each other along the first axis by the first drive from the welding position to the initial position, and wherein the first, the second and the third drive are each electronically coupled to and depend upon each other, in which the controller controls the third drive with the first drive and the second drive and at least two of the first drive, the second drive and the third drive are energized at the same time, and in case of a failure of one said drive, the remaining drives which are energized at least partly at the same time are automatically stopped by the controller.

2. The welding method according to claim 1, wherein the welding method is a vibration welding method or an infrared welding method.

3. The welding method according to claim 1, wherein the first drive and the second drive are servo drives.

4. The welding method according to claim 1, wherein one said drive acts as a master drive and the remaining drives act as slave-drives.

5. A plastic welding device for welding a first component consisting of plastic material to a second component consisting of plastic material, the welding device comprising:

a. an upper tool mounted to an upper support adapted to receive the first component, wherein the upper support is an upper tool plate and the upper tool reflects a shape of the first component, b. a lower tool mounted to a lower support adapted to receive the second component, wherein the lower support is a lifting table and the lower tool reflects a shape of the second component, as well as c. an infrared preheating arrangement adapted to preheat the first and/or the second component, wherein the infrared preheating component comprises a first preheating device arranged on an upper side and/or a second preheating device on a lower side, wherein the first and second preheating devices have a shape matching the form provided by the respective tools, wherein d. the upper support and the lower support are movable relative to each other along a first axis by a first drive between an initial position, an adjacent position, a spaced position, and a welding position and e. the infrared preheating arrangement is movable by a second drive and a third drive between a parking position, in which the preheating arrangement is not arranged between the upper tool and the lower tool, and a preheating position, in which the first preheating device faces the upper tool and/or the second preheating device faces the lower tool, wherein the infrared heating arrangement is movable by the second drive along a second axis that is perpendicular to the first axis and by the third drive along a third axis that is parallel to the first axis, wherein f. the welding device comprises a controller controlling the first drive, the second drive and the third drive such that at least two of the first drive, second drive and third drive are energized at least partly at the same time such that a continuous movement of the upper and the lower tool relative to each other between the first position and the adjacent position and a continuous movement of the infrared preheating arrangement between the parking position and the preheating position occur at least partly at the same time, wherein the first drive and the second drive are electronically coupled to and depend on each other, and in the case of a failure of one said drive, the remaining drives which are energized at least partly at the same time are automatically stopped by the controller.

6. The welding device according to claim 5, wherein the welding device is a vibration welding device or an infrared welding device.

7. The welding device according to claim 5, wherein the first and the second drive are servo drives.

* * * * *

UNITED STATES PATENT AND TRADEMARK OFFICE
CERTIFICATE OF CORRECTION

| | | |
|---|---|---|
| PATENT NO. | : 12,194,688 B2 | Page 1 of 1 |
| APPLICATION NO. | : 18/079999 | |
| DATED | : January 14, 2025 | |
| INVENTOR(S) | : Heiko Priem and Wolfgang Kreckel | |

It is certified that error appears in the above-identified patent and that said Letters Patent is hereby corrected as shown below:

On the Title Page

Item (71), Applicant should read: BRANSON Ultraschall Niederlassung der Emerson Technologies GmbH & Co. OHG Item (73), Assignee should read: BRANSON Ultraschall Niederlassung der Emerson Technologies GmbH & Co. OHG Signed and Sealed this
Eighth Day of July, 2025

Coke Morgan Stewart
*Acting Director of the United States Patent and Trademark Office*